United States Patent
Bertin

[15] 3,677,361
[45] July 18, 1972

[54] PRESSURE FLUID CONFINING FACILITY FOR GROUND-EFFECT MACHINE

[72] Inventor: Jean Henri Bertin, Neuilly-sur-Seine, France

[73] Assignee: Societe d'Etudes et de Development des Aeroglisseurs Marins Terrestres et Amphibies S. E. D. A. M., Paris, France.

[22] Filed: May 18, 1970

[21] Appl. No.: 38,081

[30] Foreign Application Priority Data

May 19, 1969 France..................................6916133

[52] U.S. Cl..............................180/127, 24/232, 180/121
[51] Int. Cl...........................................................B60v 1/16
[58] Field of Search........................180/127, 128; 150/52 R; 135/1 R, 15 CF; 160/368 G; 24/232

[56] References Cited

UNITED STATES PATENTS

| | | | |
|---|---|---|---|
| 1,363,516 | 12/1920 | Kuhl | 24/232 |
| 2,186,535 | 1/1940 | MacGeorge | 135/15 CF UX |
| 2,650,401 | 9/1953 | LaMond | 135/15 CF UX |
| 2,652,845 | 9/1953 | O'Neill et al. | 135/1 R |
| 3,156,604 | 11/1964 | Blatt | 160/368 G X |
| 3,244,248 | 4/1966 | Prickett | 180/127 |
| 3,244,248 | 4/1967 | Bertin | 180/127 |
| 3,481,424 | 12/1969 | Barr | 180/128 x |
| 3,511,331 | 5/1970 | Landry | 180/127 |

FOREIGN PATENTS OR APPLICATIONS

| | | | |
|---|---|---|---|
| 1,803,008 | 4/1969 | Germany | 180/127 |

*Primary Examiner*—A. Harry Levy
*Attorney*—Brufsky, Staas, Breiner and Halsey

[57] ABSTRACT

A pressure fluid confining skirt facility for a ground-effect machine formed by a juxtaposition of sealing-tight detachable elementary panels each comprising a network of criss-crossed resilient elements which act as strong reinforcements and are connected to attaching members disposed towards the periphery of the panel for its attachment in position in the skirt facility.

5 Claims, 19 Drawing Figures

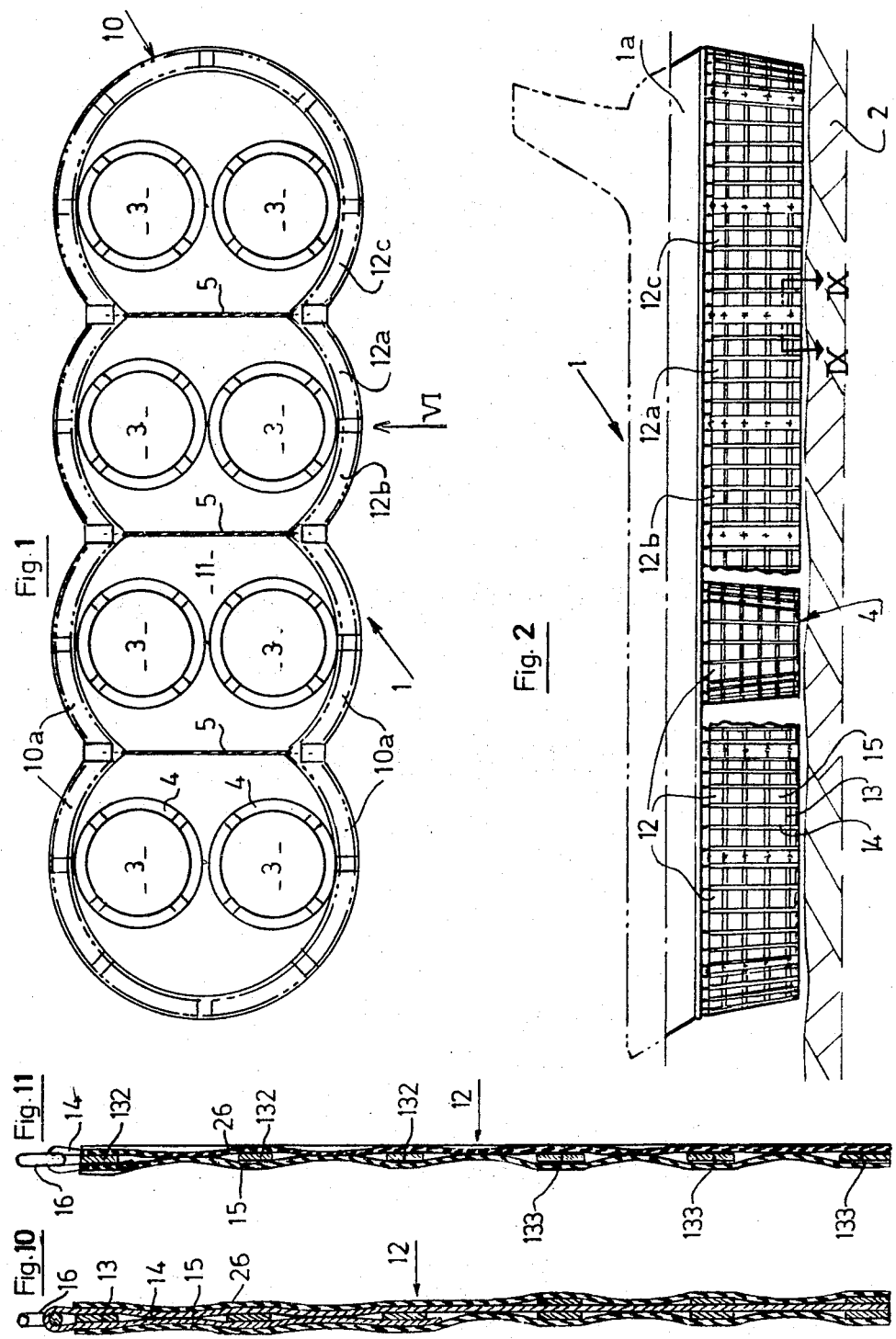

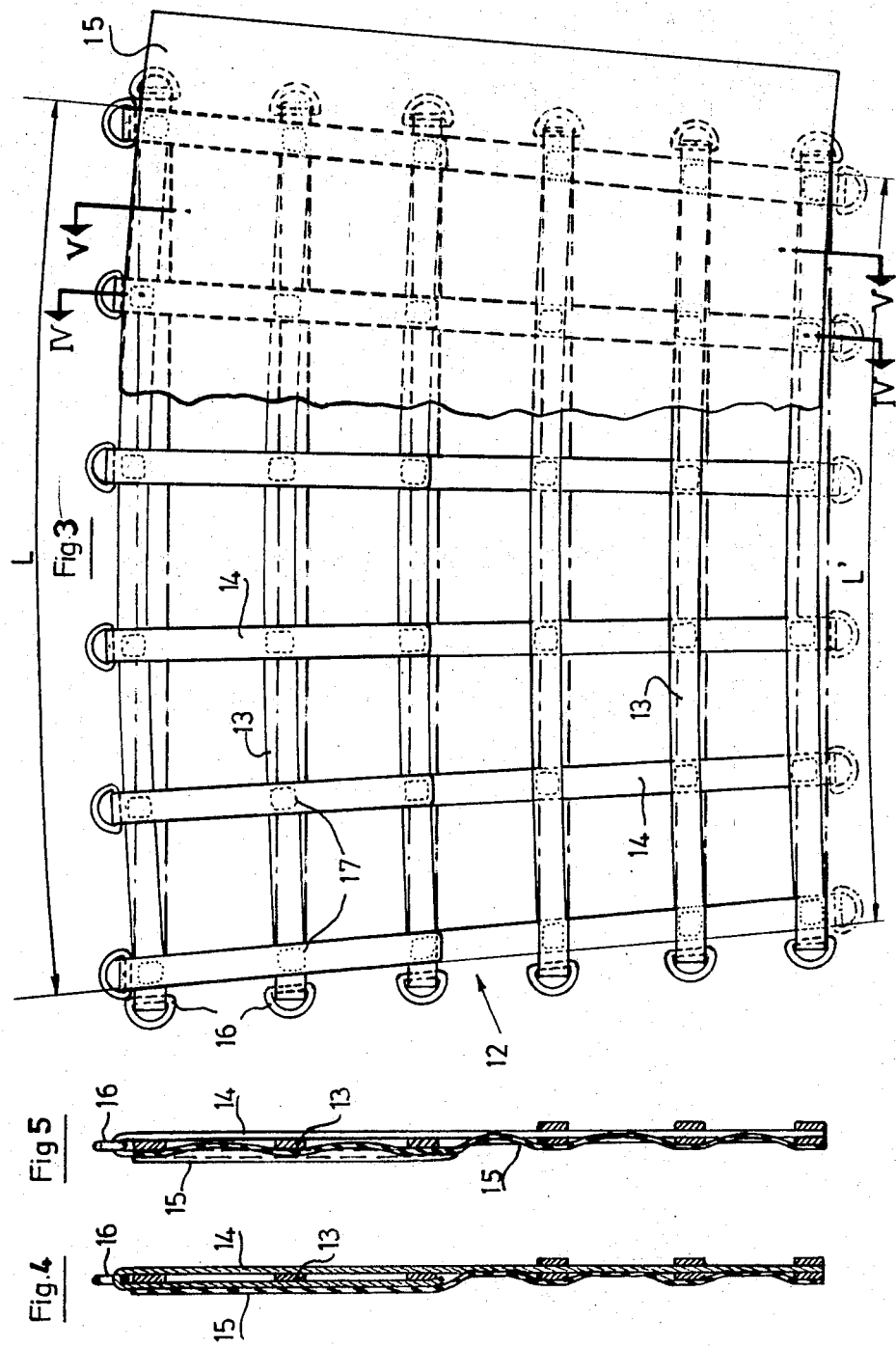

Patented July 18, 1972
3,677,361
5 Sheets-Sheet 3
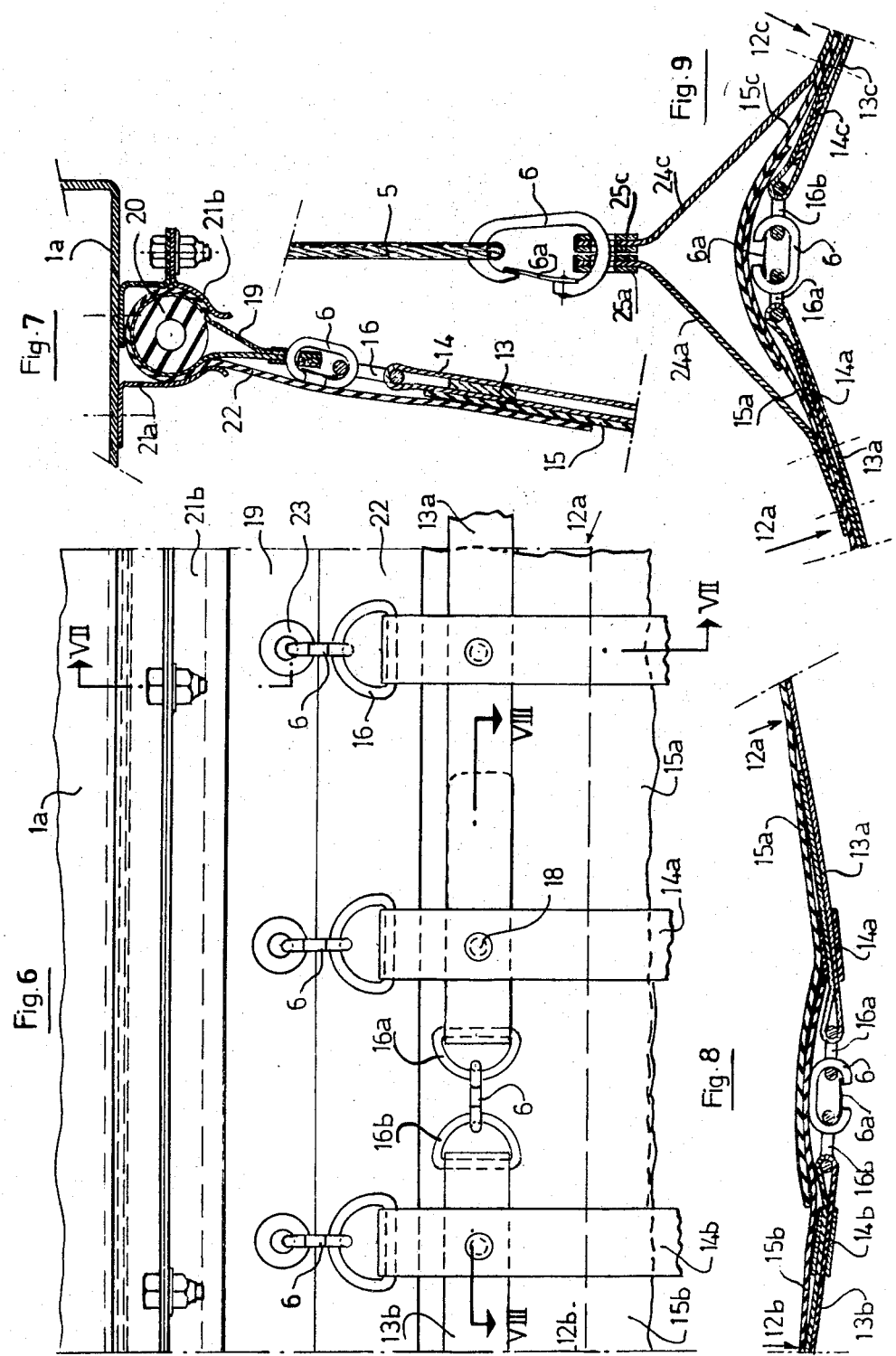

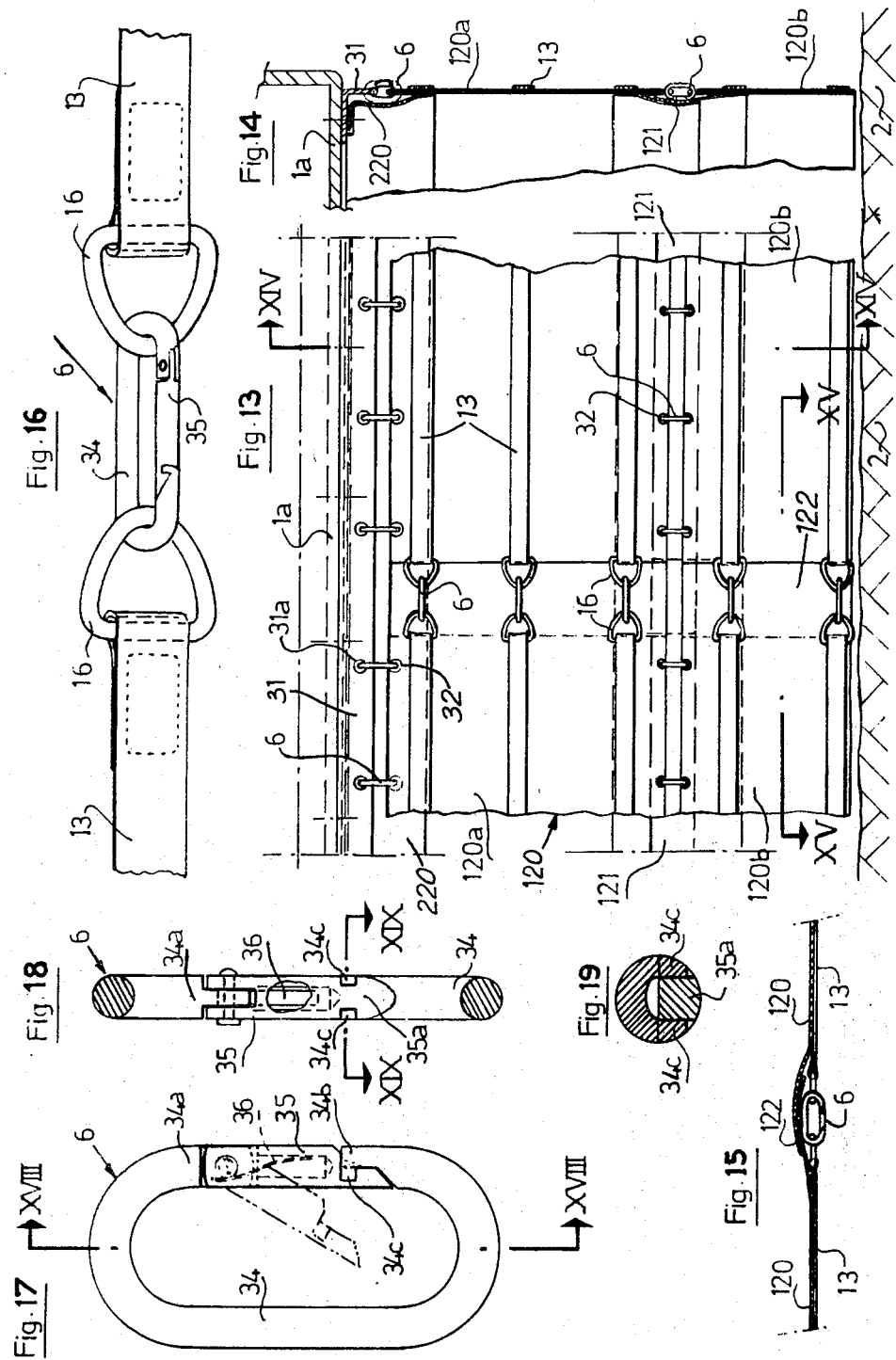

PRESSURE FLUID CONFINING FACILITY FOR GROUND-EFFECT MACHINE

The invention relates to ground-effect machines co-operating with a bearing surface along which the machines can move via the agency of at least one pressure fluid cushion. The invention provides a pressure fluid confining facility associated with a ground-effect machine.

A confining facility according to the invention comprises at least one resilient wall comprising a network of resilient elements such as, for instance, straps, which are connected to one another at their intersections, the or each resilient wall extending between the bearing surface and an end wall opposite the bearing surface and connected to the machine structure ; the resilient elements can be extensible. Sealing-tightness between the meshes of the network can be ensured by at least one resilient sealing-tight wall made, for instance, of canvas-covered rubber and connected to the network.

In a confining facility according to the invention the forces are mainly taken by the resilient elements, the resilient sealing-tight wall taking only the forces due to the pressure exerted on the mesh of the network, so that the wall can be thin and therefore light in weight and resilient. A confining facility can comprise a single network disposed along an endless surface on the periphery of the enclosure where the cushion is formed. A confining facility can also comprise a plurality of networks interconnected by attaching means. Each network can extend from the machine end wall to the vicinity of the bearing surface. The networks can also be associated with one another, for instance, in pairs, one of them being disposed adjacent the machine end wall and connected thereto, the other network being attached to the preceding one extending as far as the vicinity of the bearing surface.

According to another feature of the invention, a network comprises a plurality of first resilient elements substantially parallel with such end wall opposite the bearing surface, and a plurality of second resilient elements substantially perpendicular to the first elements. The means for connecting a network to the machine structure or to another network can co-operate with the ends of the resilient elements and are preferably detachable.

A network can also comprise a plurality of resilient elements substantially inclined in relation to the end wall opposite the bearing surface, and a plurality of other resilient elements also substantially inclined in relation to such wall and intersecting the first elements. Preferably, the two layers or resilient elements are substantially symmetrical in relation to an axis substantially perpendicular to such wall.

Advantageously, the resilient elements can have different mechanical resistances to the forces. For instance, their strength can be greater adjacent the bearing surface. Another juxtaposed resilient element can also be associated with each resilient element over at least a portion of its length.

The invention also relates to detachable connecting members of at least two elements forming part of a pressure fluid confining facility associated with a ground-effect machine, more particularly, for at least two of the resilient elements.

A detachable connecting member can be formed by a split ring of the snap hook kind comprising a main member whose two opposite free ends are spaced out from one another, and mobile closure means for connecting such ends.

In one embodiment of the invention such mobile means are formed by an arm articulated to one of the ends and co-operating in the closed position with the other end so as to be connected thereto. For instance, the arm comprises a narrowed portion which in the closed position engages between two stops borne by the end of the main member. Preferably, the arm rotates towards the inside of the ring for the opening thereof. A spring can be provided for retaining the arm in the closed position.

The connecting members according to the invention can be adapted to connect a pressure fluid confining wall to the end wall opposite the bearing surface of the machine with which it co-operates. The connecting members can also be adapted to interconnect the elementary confining walls of a pressure fluid cushion. The elementary walls can be of any known type. For instance, they are formed by networks of resilient elements, as stated hereinbefore. In that case sealing tightness at the level of the attaching members can be ensured by resilient joints applied against such members by the pressure of the cushion.

The invention applies more particularly to ground-effect machines comprising a plurality of pressure fluid cushions, such cushions being enclosed by a peripheral wall confining an extra fluid cushion supplied, for instance, from the leakages from the inside cushions. In that case, the peripheral wall can advantageously be constructed according to the invention. The forces, which are considerable in a wall of this kind, are taken by the resilient elements. Moreover, if the wall has deteriorated locally, it is enough to change the corresponding elementary wall and, due to the quick attaching devices, this could be done very readily in a very short time. Of course, the inside fluid cushions can also comprise confining walls according to the invention.

The invention will be clearly understood from the following non-limitative exemplary description with reference to the accompanying drawings ; features to be gathered both from the drawings and the description of course from part of the invention.

FIG. 1 is a diagrammatic plan view of a ground-effect machine comprising confining walls according to one embodiment of the invention ;

FIG. 2 is an outside elevation, partly broken away, showing the confining walls associated with the ground-effect machine ;

FIG. 3 is a view showing a network of resilient elements laid out flat, the resilient sealing-tight wall being partially broken away ;

FIG. 4 is a sectional view, taken along the line IV—IV in FIG. 3 ;

FIG. 5 is a sectional view, taken along the line V—V in FIG. 3 ;

FIG. 6 is a partial outside view, to an enlarged scale and taken in the direction indicated by the arrow VI in FIG. 1 ;

FIG. 7 is a sectional view, taken along the line VII—VII in FIG. 6 ;

FIG. 8 is a partial sectional, taken long the line VIII—VIII in FIG. 6 ;

FIG. 9 is a sectional view, to an enlarged scale and taken along the line IX—IX in FIG. 2 ;

FIG. 10 is a view similar to FIG. 4, to an enlarged scale, showing a variant embodiment of a network of resilient elements ;

FIG. 11 is a view similar to FIG. 5, to an enlarged scale, showing another variant embodiment of a network of resilient elements ;

FIG. 13 is a partial outside view of a confining wall in another embodiment according to the invention of the quick-attaching members ;

FIG. 14 is a sectional view, taken along the line XIV—XIV in FIG. 13 ;

FIG. 15 is a partial sectional view, taken along the line XV—XV in FIG. 13 ;

FIG. 16 is a perspective view, to an enlarged scale, of a detachable connecting member according to the invention ;

FIG. 17 is an outside view, to an enlarged scale, of a split ring according to the invention ;

FIG. 18 is a sectional view, partially broken away and taken along the line XVIII—XVIII in FIG. 17, and FIG. 19 is a section, to an enlarged scale, taken along the line XIX—XIX in FIG. 18.

Figure 12:
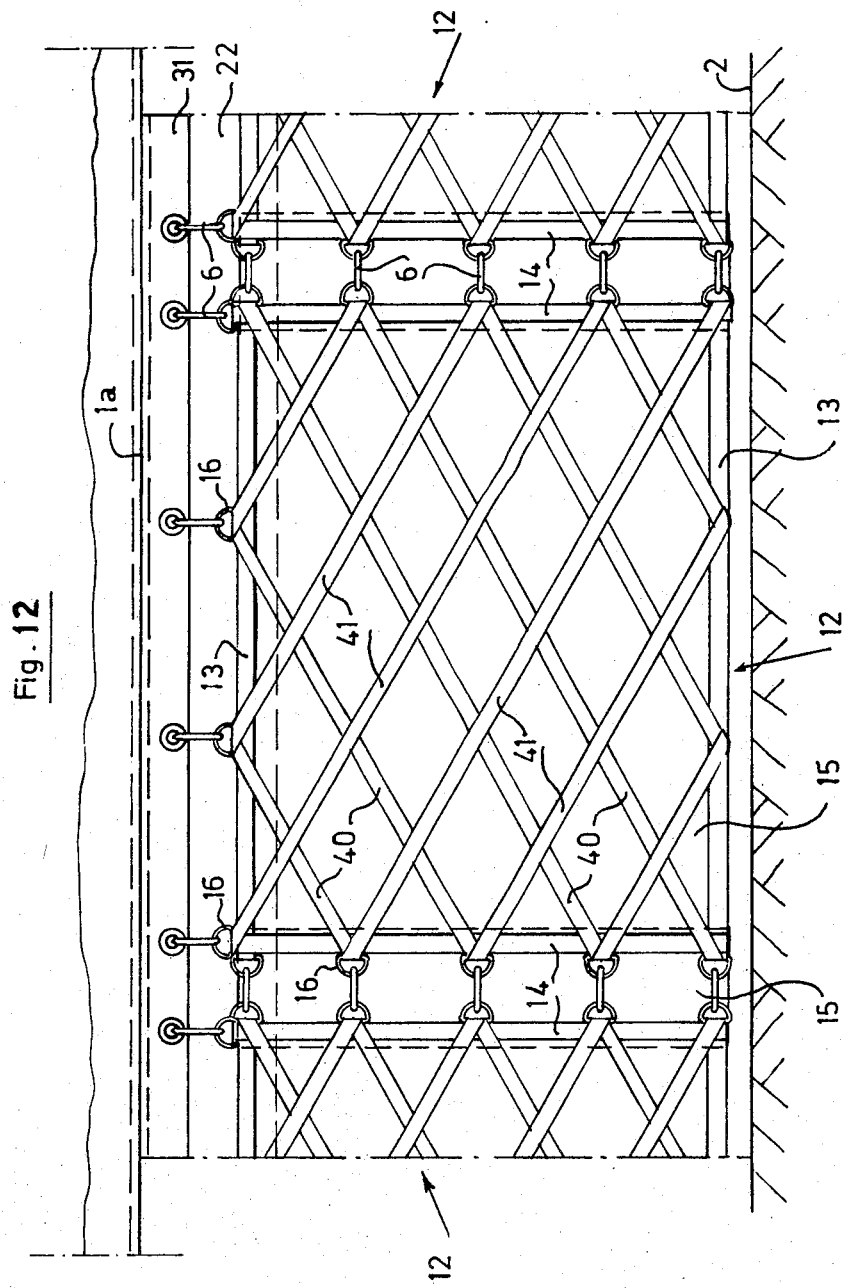
FIG. 12 is a partial outside view of a pressure fluid confining wall in another embodiment of the invention.

To make the drawings clearer, the thicknesses of the resilient elements 13, 14 and of the sealing tight walls 15 are not shown to scale.

FIGS. 1 and 2 show a ground-effect machine 1 co-operating with a bearing surface 2 along which the machine 1 can move via the agency of a plurality of pressure fluid cushions confined in enclosures 3 by resilient walls 4. In the embodiment illustrated, the machine 1 comprises eight pressure fluid cushions 3 whose confining walls 4 have a straight circular section and are of substantially frustoconical shape flared in the direction of the structure of the machine 1. The cushions 3 are disposed on either side of the central longitudinal plane of the machine and substantially symmetrically in relation to such plane. To simplify the drawings, the cushion-supplying device is not shown.

A peripheral confining wall 10 encloses the cushions 3 to bound an enclosure 11 confining an extra pressure fluid cushion supplied, for instance, from the leakages from the cushions 3. The wall 10 is multilobed, its lobes 10a preferably having a straight section substantially in the form of the arc of a circle. The wall 10 advantageously has a section which is smaller at its free end adjacent the surface 2 than at a transverse level further away from such surface.

Connecting members 5, for instance cables, connect transversely the ends of the lobes 10a symmetrical in relation to the central longitudinal plane of the machine, thus enabling the wall 10 to maintain its multi-lobed shape in spite of the pressure in the cushion 11.

The walls 10, 4 are formed by the assembly of a large number of elementary walls 12 which will now be described with reference to FIGS. 3-9. Each elementary wall 12 is formed by a network of resilient elements 13, 14 such as, for instance, straps which can be extensible and to which there is attached, by glueing, clipping, or any other means, at least one resilient fluid-tight wall 15 which can also be extensible. The resilient wall 15 can be made, for instance, from canvas-covered rubber and the strap 13 or 14 can be made, for instance, by weaving. The network of elements 13, 14 is so constructed that when the elementary wall 12 is mounted on the machine 1, the resilient elements 13 are substantially parallel with the machine end wall 1a opposite the bearing surface 2 and the resilient elements 14 are substantially perpendicular to the elements 13 and extend from the structure 1a in the direction of the surface 2. Preferably, but not necessarily, the wall 15 is attached to the resilient elements 13, 14 inside the cushion.

In the embodiments illustrated in the drawings, the end wall 1a forms the end of the machine structure. Of course, the end wall can be separate from the machine structure and rigidly or detachably connected thereto.

FIGS. 3-5 show an elementary wall 12 laid out flat, in an embodiment in which when mounted on the machine the wall has the shape of the portion of a frustrum. The resilient elements 13 are then disposed substantially in concentric circles and the elements 14 are disposed in straight lines which substantially concur at the center of the circles. The width L' of a network adjacent the bearing surface 2 is therefore in this case less than the width L of the network adjacent the machine wall 1a. The values L, L' are so selected that the conicity of the cushion confining wall is suitable under loading and preferably the elementary walls 12 are all interchangeable. If the required conicity is not very high and an elementary wall 12 is to form only a small portion of a frustrum, the radii of the portions of a circle on which the elements 13 are to be disposed are very great and the elements 13 can be substantially rectilinear, as shown in chain-dot lines in FIG. 3.

Clearly, this arrangement of the elements 13, 14 is given merely by way of example and the arrangement will vary in dependence on the shape which any network 12 is to be given when it is mounted on the machine.

The resilient elements 13 are curved on themselves at their ends, thus enabling them to bear a closed attaching ring 16. The same thing applies to resilient elements 14 at their ends disposed on the side of the machine wall 1a. In the embodiment described, the elements 14 are therefore doubled on the side of the machine structure over a portion, for instance one-half, of their length. Similarly, a portion, for instance one-half, of the elements 13 disposed on the side of the bearing surface are doubled over their whole length. Of course, if the opposite lateral edges of two adjacent elementary networks 12 are not parallel, for instance, due to different conicities, each element 13 can be continued beyond the network in a suitable and preferably adjustable manner, to enable two corresponding attaching rings 16 to be close enough to one another. The resilient elements 13 can be connected to the elements 14 at their intersections by seams 17 (FIG. 3) or by rivets 18 enabling the elements to rotate in relation to one another (FIG. 6) or by any other suitable means.

FIGS. 6-9 illustrate details of the attachment of the elementary walls 12 to one another and to the structure or end wall 1a of the machine.

An intermediate, preferably resilient wall 19 is wound around a rubber tube 20 and extends in the direction of the bearing surface 2. The rubber tube 20 is clamped between an appendix 21a of the wall 1a inside the cushion, and an appendix 21b of the wall 1a which is detachable and outside the cushion. The intermediate wall 19 is formed with apertures reinforced by eyelets 23. Each attaching ring 16 of the resilient element 14 is connected to an eyelet 23 via a quick-opening split ring 6 of the snap hook type. The split ring 6 is closed by a readily actuable resilient strip 6a. Sealing tightness at the level of the rings 6 is ensured by a resilient sealing tight drip flap 22 also wound around the tube 20 on the wall 19 ; the drip flap extends in the direction of the bearing surface 2 inside the cushion and is applied by the pressure against the intermediate wall 19, the rings 6 and a portion of the elementary walls 12 (FIG. 7).

Two adjacent elementary walls 12a, 12b are also connected to one another via quick-opening rings 6 which extend in the corresponding attaching rings 16a, 16b (FIG. 8).

Sealing tightness at the level of the rings 6 is ensured by the walls 15a, 15b which are continued laterally beyond the network of resilient elements and partly overlap one another, being applied against the rings 6 by the pressure of the cushion. FIG. 9 illustrates the details of the attachment of the two elementary walls 12a, 12c in a case in which they form part of two different lobes 10a. Links 24a, 24c connected to the elementary walls 12a, 12c respectively, for instance, by sewing at the level of the straps 13a, 13c terminate at their free ends in eyelets 25a, 25c respectively. An eyelet 25a and an eyelet 25c are connected to a connecting member 5 via a quick-opening ring 6.

In confining walls, as 10 and 4, the forces are mainly taken by the resilient elements 13, 14, and the wall 15 ensuring sealing tightness takes substantially no other force than that due to the pressure of the cushion exerted on the surface of a mesh of the network. The wall 15 can therefore be thin and of light weight. Moreover, if the wall 10 is worn locally, it is enough to replace the corresponding elementary wall 12 ; due to the quick-opening rings 6, this can be done very quickly and readily.

Of course, as illustrated in FIGS. 1 and 2, the walls 4 of the inside cushions 2 can also be formed by a plurality of elementary walls 12.

Clearly, the elementary walls 12 can be embodied in various ways without exceeding the scope of the invention.

More particularly (FIGS. 10 and 11) two resilient sealing tight walls 15, 26 can be attached on either side of a network of resilient elements 13, 14.

Referring to FIG. 10, the resilient elements 14 doubled over a portion of their length are attached not only to the resilient elements 13 which they intercept, but also to themselves, for instance, by sewing. This arrangement produces an improved absorption of the forces. The same thing can apply to the doubled elements 13.

FIG. 11 shows only one thickness of resilient elements 13 or 14. In this case the element 13 or 14 can be of variable strength, in dependence on the levels. For instance, the resilient elements 133 disposed adjacent the bearing surface 2 are stronger than the elements 132 disposed adjacent the machine end wall, as shown in FIG. 11.

Moreover, in this variant embodiment, the two sealing tight walls 15, 26 are not attached to the resilient elements 13 or 14, but to one another, between two consecutive resilient elements.

As shown in chain-dot lines in FIG. 3, the resilient elements 14 can have closed rings 16 at their ends disposed on the side of the bearing surface 2. Thus, at least two elementary walls 12 can be associated, one of them being connected to the machine wall 1a, the other being attached to the first one and extending as far as the vicinity of the bearing surface 2. Each of the two associated elementary walls 12 can have different mechanical characteristics.

Referring to FIG. 12, an elementary wall or network 12 comprises resilient elements 40, 41 which intersect and are substantially inclined in relation to the machine wall 1a. In the embodiment described, the elements 40, 41 are disposed substantially symmetrically in relation to an axis substantially perpendicular to the machine wall 1a opposite the bearing surface 2. The elements 40 are substantially parallel with one another, and so are the elements 41. A wall 12 is limited at its periphery by resilient elements 13, 14 comprising, as in the previous embodiment, attaching rings 16 at their ends. Outside the apexes, the periphery of the wall 12 advantageously corresponds with the places of intersection of two elements 40, 41 jointly associated with an attaching ring 16. As in the previous embodiment, quick-opening rings 6 enable two walls 12 to be connected to one another or one wall to be connected to an appendix 31 connected to the structure 1a.

In the embodiments disclosed hereinbefore, a cushion is confined in an enclosure comprising a number of networks. Of course, a single network could be provided disposed along an endless surface on the periphery of the enclosure where the cushion is confined.

FIGS. 13–19 illustrate a variant embodiment of the invention comprising an improved quick-opening ring 6. In this embodiment, a pressure fluid confining wall is formed by the assembly of a plurality of resilient, sealing tight elementary fluid confining walls 120. The elementary walls 120 are associated in pairs, one 120a of them being attached to the machine end wall 1a and extending in the direction of the bearing surface 2, the other elementary wall 120b being attached to the wall 120a in the continuation thereof and extending as far as the vicinity of the bearing surface 2. The walls 120b can be stronger than the walls 120a. An appendix 31 of the wall 1a, extending in the direction of the bearing surface 2, is formed with holes 31a. A wall 120a is connected to the appendix 31 via the agency of quick-opening rings extending in the holes 31a and the eyelets 32 associated with the wall 120a. Sealing tightness is ensured by a resilient sealing tight endless wall 220 attached to the wall 1a and applied by the pressure of the cushion to the rings 6. A wall 120a and the associated wall 120b are also connected via the agency of rings 6 co-operating with eyelets 32. Sealing tightness is ensured by resilient sealing tight continuations 121 of the walls 120a, 120b which overlap one another at the level of the rings 6 and are applied thereagainst by the pressure of the cushion. In the embodiment described, resilient elements 13, such as straps, are attached to each elementary wall 120 substantially parallel with the machine end wall opposite the bearing surface 2. The resilient elements 13 are, for instance, sewn and/or clipped and/or glued to each wall 120 and terminate in closed, for instance, metal rings 16. Each pair of walls 120a, 120b is connected to an adjacent pair of walls 120a, 120b via quick-opening rings 6 extending in the closed rings 16. Sealing tightness is ensured by resilient sealing tight lateral continuations 122 of the walls 120 which overlap one another and are applied against the rings 6 by the pressure of the cushion (FIG. 15).

The straps 13 take the lateral connecting forces which are considerable and therefore enable the wall 120 to have less resistance and therefore to be lighter in weight and more resilient.

However, in some cases the straps 13 can be dispensed with, and the elementary walls 120 can be connected laterally by rings 16 extending in eyelets. Similarly, straps can be provided which are substantially perpendicular to the machine end wall or inclined in relation thereto.

FIGS. 16–19 show details of an embodiment of a quick-opening split ring 6. It comprises a main member 34 whose two opposite free ends 34a, 34b leave the gap between them. A closure arm 35 is articulated to the end 34a in a cap and has a narrowed portion 35a adjacent its free end. It can co-operate via the agency of the narrowed portion 35a with stops 34c continuing the end 34b of the main member 34 and thus so interconnecting the two ends 34a, 34b as to take the longitudinal tensile forces. The lateral forces on the arm 35 are taken by its articulation to the end 34a and by the stops 34c. The arm 35 is retained in the closed position by a resilient strip 36. The arm 35 enables the rings 6 to be opened by moving towards the inside of the ring.

A ring 6 of this kind can take very considerable forces while still remaining able to open very quickly and readily. The replacement of an elementary confining wall therefore requires only a short inoperative period.

Of course, a ring 6 of this kind can advantageously be used in the embodiment illustrated in FIGS. 1–12.

Clearly, the embodiments described hereinbefore are merely exemplary and could be modified, inter alia by the substitution of technical equivalents, without exceeding the scope of the invention. More particularly, the resilient elements forming the network, or each network, might be joined edge to edge or mounted overlapping, so as to form a fluid-impermeable wall.

I claim:
1. A surface effect machine having a rigid structure movable above a bearing surface with the interposition of a pressure fluid cushion, and a fluidtight flexible skirting system depending from said structure and extending towards said surface for laterally confining said pressure fluid cushion, said skirting system comprising a plurality of juxtaposed standard panels each having a network of flexible reinforcement members in reticular formation ending towards the periphery of the respective panels, and peripherally located attaching means at the ends of said reinforcement members for detachably securing each panel in said skirting system, whereby said panels are individually fittable to and removable from said skirting system without disturbing the remainder thereof.

2. Surface effect machine as claimed in claim 1 wherein said flexible reinforcement members in reticular formation are made of elastically extensible material.

3. Surface effect machine as claimed in claim 1 wherein said flexible reinforcement members in reticular formation are interconnected flat straps attached to each other at the intersections thereof.

4. Surface effect machine as claimed in claim 1 wherein said peripherally located attaching means comprise rings and quick-release snap hooks engaging said rings.

5. Surface effect machine as claimed in claim 1 wherein said skirting system further comprises sealing flaps arranged on the inside of said skirting system in overlap of the peripheral portions of adjacent panels and astride said peripherally located attaching means, whereby said flaps are pressed by cushion pressure in sealing engagement with said peripheral portions of said panels.

* * * * *